United States Patent [19]

Pressprich et al.

[11] Patent Number: 5,367,641
[45] Date of Patent: Nov. 22, 1994

[54] MIL-STD-1553 INTERFACE DEVICE HAVING A BUS CONTROLLER MINOR FRAME TIMER

[75] Inventors: John W. Pressprich, Woodland Park; Anthony F. Jordan; Timothy D. Hornback, both of Colorado Springs; Gregory S. Carr, Boulder, all of Colo.

[73] Assignee: United Technologies Corporation, Hartford, Conn.

[21] Appl. No.: 971,434

[22] Filed: Nov. 4, 1992

[51] Int. Cl.[5] .......................................... G06F 13/00
[52] U.S. Cl. ................................................. 395/275
[58] Field of Search ....................................... 395/275

[56] References Cited

U.S. PATENT DOCUMENTS

| | | | |
|---|---|---|---|
| 4,136,400 | 1/1979 | Caswell et al. | 364/900 |
| 4,453,229 | 6/1984 | Schaire | 364/900 |
| 4,500,933 | 2/1985 | Chan | 360/69 |
| 4,638,451 | 1/1987 | Hester et al. | 364/900 |
| 4,805,137 | 2/1989 | Grant et al. | 364/900 |
| 4,959,782 | 9/1990 | Tulpule et al. | 364/200 |
| 5,012,404 | 4/1991 | Pressprich | 364/200 |
| 5,093,910 | 3/1992 | Tulpule et al. | 395/575 |
| 5,111,423 | 5/1992 | Kopec, Jr. et al. | 395/500 |
| 5,111,450 | 5/1992 | Cooledge et al. | 370/13 |
| 5,181,201 | 1/1993 | Schauss et al. | 370/85.1 |
| 5,185,862 | 2/1993 | Casper et al. | 395/250 |
| 5,223,788 | 6/1993 | Andreano et al. | 324/158 R |

Primary Examiner—Dale M. Shaw
Assistant Examiner—Fran R. Faller
Attorney, Agent, or Firm—Richard H. Kosakowski

[57] ABSTRACT

An integrated circuit ("IC") interfaces a piece of communications equipment to a MIL-STD-1553 bus in accordance with the MIL-STD-1553 interface standards and operates in the MIL-STD-1553 defined bus controller mode of operation. The IC implements a command block configuration of data storage locations in an external memory. The command block includes a plurality of words arranged contiguously, a first word indicative of one of a plurality of different opcodes that define operation of the IC. The command block words include a MIL-STD-1553 defined command to be transmitted on the bus by the IC. A plurality of command blocks are arranged contiguously in a minor frame format. In order to sequentially execute a plurality of minor frames at different frequencies, the IC contains an internal timer that controls execution time of each minor frame. The first command block of each minor frame contains an opcode that loads the timer with a predetermined value for the corresponding frequency of execution of the particular minor frame. The timer counts down and decrements to zero before it is loaded with a value for execution frequency of the next minor frame. While the timer is decrementing, the IC executes the command blocks that follow the first command block.

4 Claims, 7 Drawing Sheets

MIL-STD-1553 INTERFACE DEVICE HAVING A BUS CONTROLLER MINOR FRAME TIMER

CROSS REFERENCE TO RELATED APPLICATIONS

This application discloses and claims material which is related to U.S. Ser. No. 07/971,435 titled A MIL-STD-1553 Interface Device Having Command Illegalization; U.S. Serial No. 07/971,439 titled A MIL-STD-1553 Interface Device Having Ping-Pong Buffering; U.S. Serial No. 07/971,748 titled A MIL-STD-1553 Interface Device Having a Bus Controller Opcode Set; U.S. Ser. No. 07/971,428 titled A MIL-STD-1553 Interface Device Having Concurrent Remote Terminal and Monitor Terminal Operation; and U.S. Ser. No. 07/972,182 titled A MIL-STD-1553 Interface Device Having Autonomous Operation in all Modes, filed on even date herewith.

TECHNICAL FIELD

The invention relates to interface devices for the MIL-STD-1553B data bus standard, and more particularly to a single integrated circuit ("IC") interface device implementing the three MIL-STD-1553B functions of bus controller, remote terminal, and monitor terminal.

BACKGROUND ART

MIL-STD-1553B ("1553") defines an asynchronous serial, command/response digital data bus on which messages are time division multiplexed among users. The transmission medium is a twisted wire cable pair. 1553 specifies all of the electrical characteristics of the receivers, transmitters, and cable used to implement the bus, as well as the complete message transmission protocol. 1553 is designed for high integrity message exchanges between unattended equipment. The messages are highly repetitive, and their content and periodicity are all pre-planned.

The United States Department of Defense ("DoD") requires the use of 1553 as the standard for all inter and intra-subsystem communications on all military airplanes, helicopters, ships and land vehicles. Originally used only in mission avionics, 1553 is now used in flight critical avionics, flight control, weapons, electrical power control, and propulsion control. 1553 was originally published in 1973 for use on the F-16 military aircraft program. The current version of 1553 is MIL-STD-1553B, Notice 2, implemented in 1986.

A number of companies provide components which implement the communication interface functions of 1553. Among them is the Model UT1553B BCRTM device, provided by United Technologies Microelectronics Center, Inc. ("UTMC") Colorado Springs, Colo. The BCRTM is a single IC that implements the three functions of 1553: bus controller, remote terminal, and monitor terminal. For more information on the UT1553B BCRTM consult the 1553 Product Handbook provided by UTMC, and U.S. Pat. No. 4,805,137, both of which are incorporated herein by reference.

However, as 1553 popularity and usage increases and IC fabrication techniques improve, there is a desire for 1553 interface devices that provide for a greater number of 1553 functions implemented on a single IC, and for increased flexibility in meeting 1553 interface design requirements.

DISCLOSURE OF INVENTION

One aspect of the present invention is to provide a single integrated circuit that contains all three of the defined MIL-STD-1553B functions.

Another aspect of the present invention is to provide a single MIL-STD-1553B integrated circuit having improved features that result in reduction of printed circuit board space, enhanced software flexibility, and reduced system host processor overhead for most MIL-STD-1553B data bus applications.

According to the present invention, an integrated circuit ("IC") interfaces a piece of communications equipment to a MIL-STD-1553 bus in accordance with the MIL-STD-1553 interface standards and operates in the MIL-STD-1553 defined bus controller mode of operation. The IC implements a command block configuration of data storage locations in a memory device external to the IC. The command block includes a plurality of words arranged contiguously, a first word being indicative of one of a plurality of different operational codes that define operation of the IC. The command block words include a MIL-STD-1553 defined command to be transmitted on the bus by the IC. A plurality of command blocks are arranged contiguously in a minor frame format. In order to sequentially execute a plurality of minor frames at different frequencies, the IC contains an internal timer that controls execution time of each minor frame. The first command block of each minor frame contains an operational code which loads the timer with a predetermined value for the corresponding frequency of execution of the particular minor frame. The timer counts down and decrements to zero before it is loaded with a value for execution frequency of the next minor frame. While the timer is decrementing, the IC executes the command blocks that follow the first command block. The timer is loaded with a timer value that allows all command blocks within that minor frame to execute.

The present invention has utility for MIL-STD-1553B applications for many military and aerospace systems applications including avionics, intra-vehicle communications, electronic warfare, electronic counter measures, radar, guidance and control, and satellites.

These and other aspects, features and advantages of the present invention will become more apparent in light of the detailed description of a best mode embodiment thereof, as illustrated in the accompanying drawings.

BEST MODE FOR CARRYING OUT THE INVENTION

Figure 1:
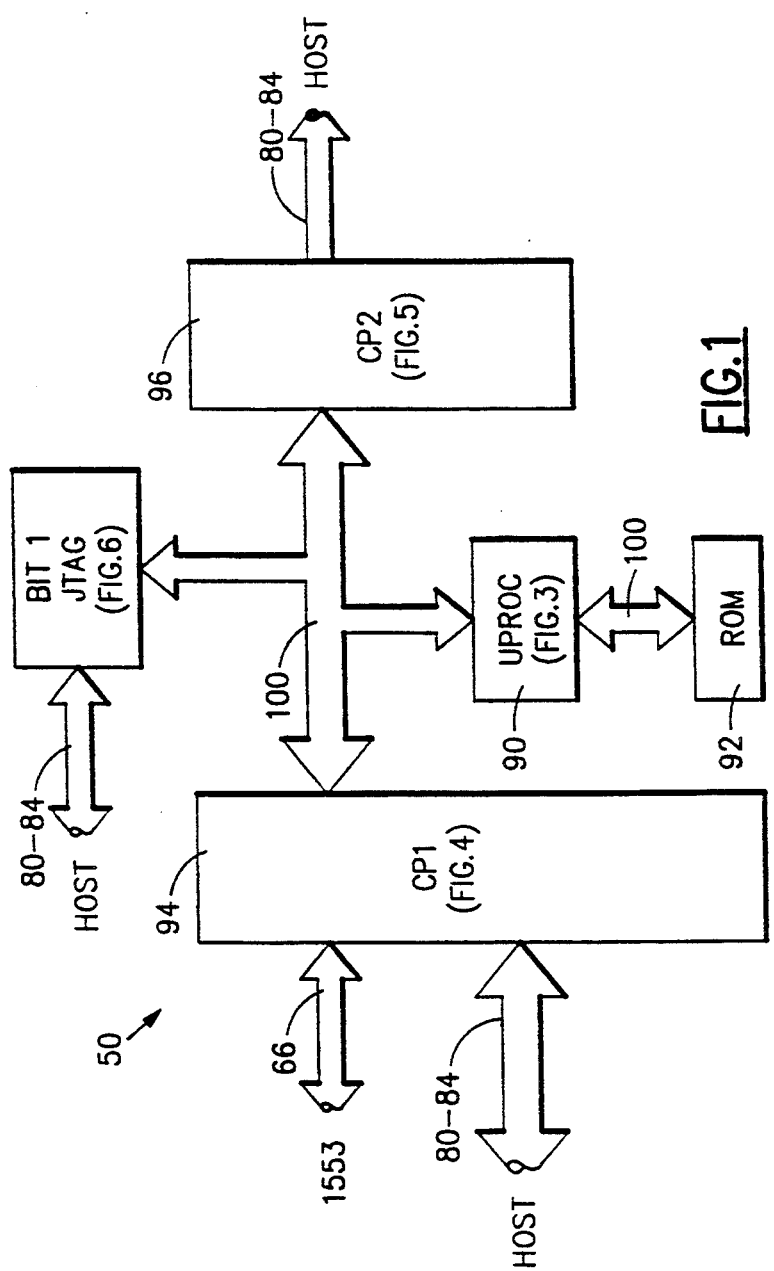
FIG. 1 is a block diagram of an IC according to the invention implementing the three defined MIL-STD-1553B functions.

FIG. 1 illustrates a block diagram of an IC 50 that implements the three 1553 terminal functions; i.e., bus controller, remote terminal, and monitor terminal. The IC 50 may be the Model UT69151, provided by United Technologies Microelectronics Center, Inc. ("UTMC"), Colorado Springs, Colo. For detailed information on the Model UT69151 IC, including device pin descriptions, timing diagrams, packaging, and DC and AC electrical specifications, consult the UT69151 Product Handbook available from UTMC, which is incorporated herein by reference.

Figure 2:
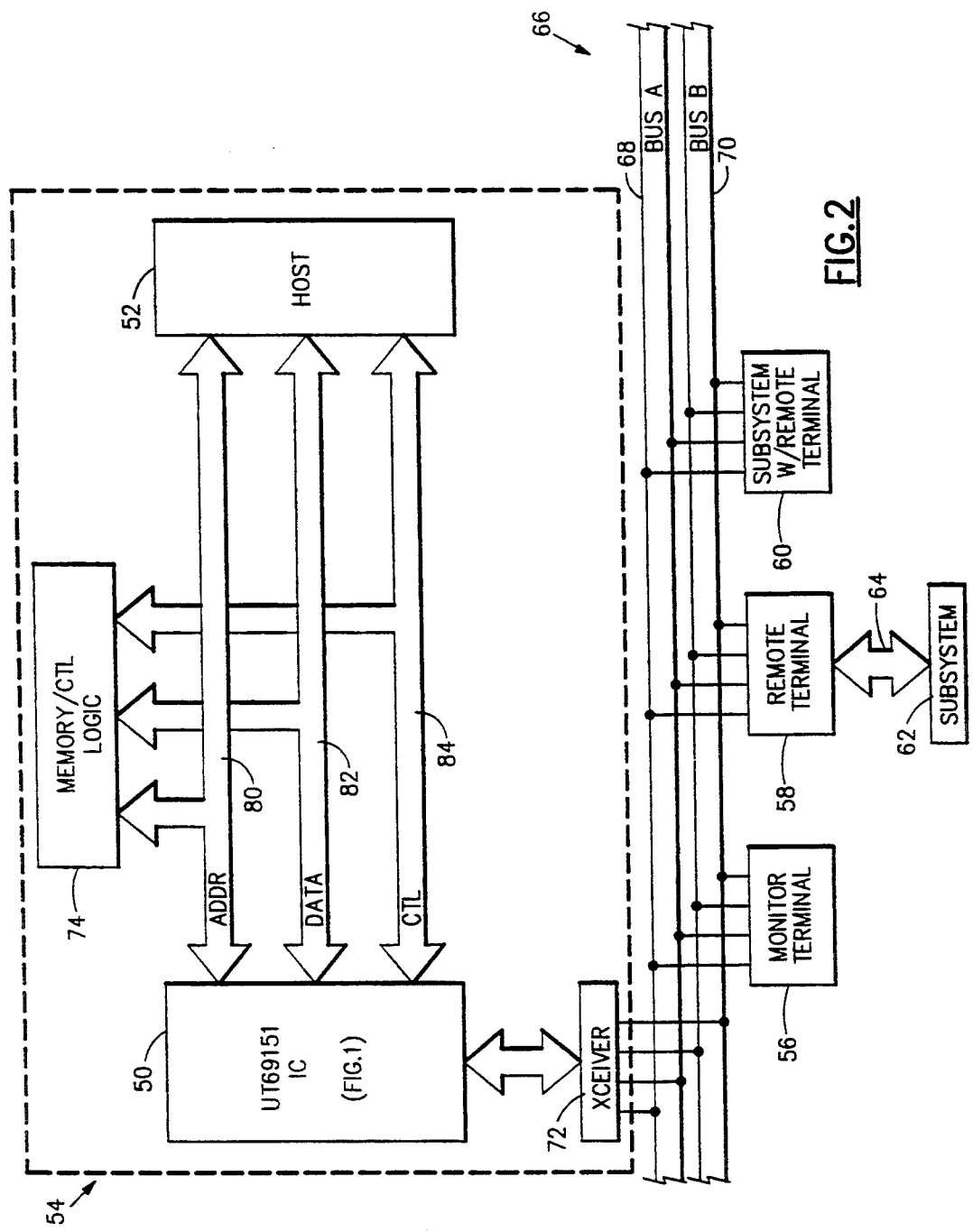
FIG. 2 is a block diagram of the integrated circuit of FIG. 1 interfaced to a host.

FIG. 2 illustrates the IC 50 of FIG. 1 interfaced to a host subsystem 52. The host may comprise a central processing unit ("CPU") along with writable memory and other circuitry. The subsystem may comprise an unattended piece of equipment 54 on a military aircraft, e.g., sensors, displays, or mission computers. The IC may be operating in, e.g., the bus controller mode of 1553. As such the bus controller initiates and directs all data flow on the 1553 bus.

The aircraft may have a plurality of other unattended equipment connected to the 1553 bus. For example, illustrated in FIG. 2 is a monitor terminal 56 and two remote terminals 58, 60; each represents a separate piece of aircraft equipment connected to the 1553 bus. The monitor terminal 56 receives communications on the 1553 bus and extracts selected information therefrom. The monitor terminal receives data for off-line purposes such as flight test, maintenance, and mission analysis.

A first remote terminal 58 is physically separate from a subsystem 62, thereby operating as a line replaceable unit ("LRU"). The terminal 58 is connected to the subsystem 62 by a bus 64. A second remote terminal 60 is embedded within a subsystem in a similar fashion to the IC 50 within the equipment 54. There can be up to 32 remote terminals connected to a single 1553 bus. The monitor terminal 56 and two remote terminals 58, 60 may each be implemented with a corresponding IC and transceiver similar to the IC and transceiver for the equipment 54 described hereinafter.

Also illustrated in FIG. 2 is a dual-redundant 553 bus 66 comprising two physical buses, bus A 68 and bus B 70. In conformance with 1553, each bus 68, 70 comprises a twisted pair of wires. Data is transmitted on the bus 66 between pieces of equipment in the known Manchester II data encoding format at a rate of one (1) megabits per second using the half duplex mode.

The IC 50 interfaces with each bus 68, 70 through a transceiver IC 72, which may comprise, e.g., the Model UT63M125 component from UTMC. The transceiver 72 translates the electronic signals from the IC to the appropriate 1553 voltage and current levels for the 1553 bus. The IC and transceiver together comprise what 1553 defines as a "terminal". A terminal is the electronic module necessary to interface the 1553 data bus with the subsystem, and is the only electronics necessary to transfer data between the data user and the 1553 data bus.

The IC interfaces to the host through either a Direct Memory Access ("DMA") or pseudo dual-port configuration. Illustrated in FIG. 2 is the DMA configuration, wherein the IC shares a common memory 74 with the host 52. The memory 74, which includes any associated control logic (e.g., arbitration logic), along with the IC and host are all interconnected through address, data and control buses 80, 82, 84. The IC 50 gains access to memory through an arbitration process using specific signals within the control bus 84. A pseudo dual-port configuration is described in the UT69151 Product Handbook from UTMC.

Referring to FIG. 1, the UT69151 IC from UTMC is a single-chip monolithic IC implemented on a 1.2 micron radiation-hardened CMOS gate array. The IC utilizes 430,000 transistors on a 495 by 495 mil die and operates at 24 MHz. The IC is built around a standard 16-bit RISC ("Reduced Instruction Set") microprocessor ("UPROC") 90 and a 3.5K by 32 bit ROM ("Read-Only Memory") 92. The powerful RISC UPROC 90 provides for automatic message handling, message status, general status, and interrupt information. The register-based interface architecture of the IC provides for many programmable functions as well as extensive information pertinent to device maintenance. The UPROC is illustrated in greater detail hereinafter with respect to FIG. 3. The IC can access up to 64K by 16 bits of external memory. Also, the IC can operate either with a tightly coupled host 52 (as illustrated in FIG. 2), or it can operate autonomously.

1553 specifies three types of message words that may be transmitted on the 1553 bus: a command word, status word, and data word. Each type of word contains 20 bits covering 20 bit times (i.e., 20 microseconds). Each word begins with a three bit sync, followed by 16 information bits, and ending with a single parity bit. 1553 also specifies ten different message formats using the three types of words.

A command word is transmitted only by a bus controller and is always the first word in a message. The first five information bits of the command word comprise the remote terminal address. Next is a remote terminal transmit/receive bit, and five bits that either designate a subaddress to the remote terminal or use of mode codes. The next five bits indicate either the data word count or a mode code.

A status word, which is always the first word in a response sent by a remote terminal, contains the five bit remote terminal address followed by an 11-bit status field. A data word, which may follow a command or status word, contains a 16-bit binary coded data value.

The UT69151 IC 50 includes two coprocessors; CP1 94 and CP2 96, which control the interface to the 1553 bus 66 and host 52. CP1 94 and CP2 96 are illustrated in greater detail hereinafter in FIGS. 4 and 5, respectively. The movement of data within the IC is controlled by the UPROC 90 by "move to" and "move from" instructions. Generally, 1553 data is routed from CP1 into UPROC and processed, or placed into CP1 from UPROC for Manchester II encoding or other control functions. When data needs to be accessed or retrieved from external memory, data is moved to or from CP2, which is responsible for DMA transfers. All data is moved internally within the IC along a bus 100 that contains address, data, control and status information.

To assist the host in managing the 1553 interface, 15 interrupt conditions can generate an informational interrupt to the host. Between message processing, the IC enters a low power standby mode that shuts down all clocking in UPROC and ROM until further command processing is required.

The IC microcode resides in the ROM 92, which utilizes the normal gate array underlayers. The ROM cell requires only the normal gate array personalization layers to construct, which simplifies placement on the array. To program the ROM, only the contact layer of the gate array mask needs to be changed.

Figure 3:
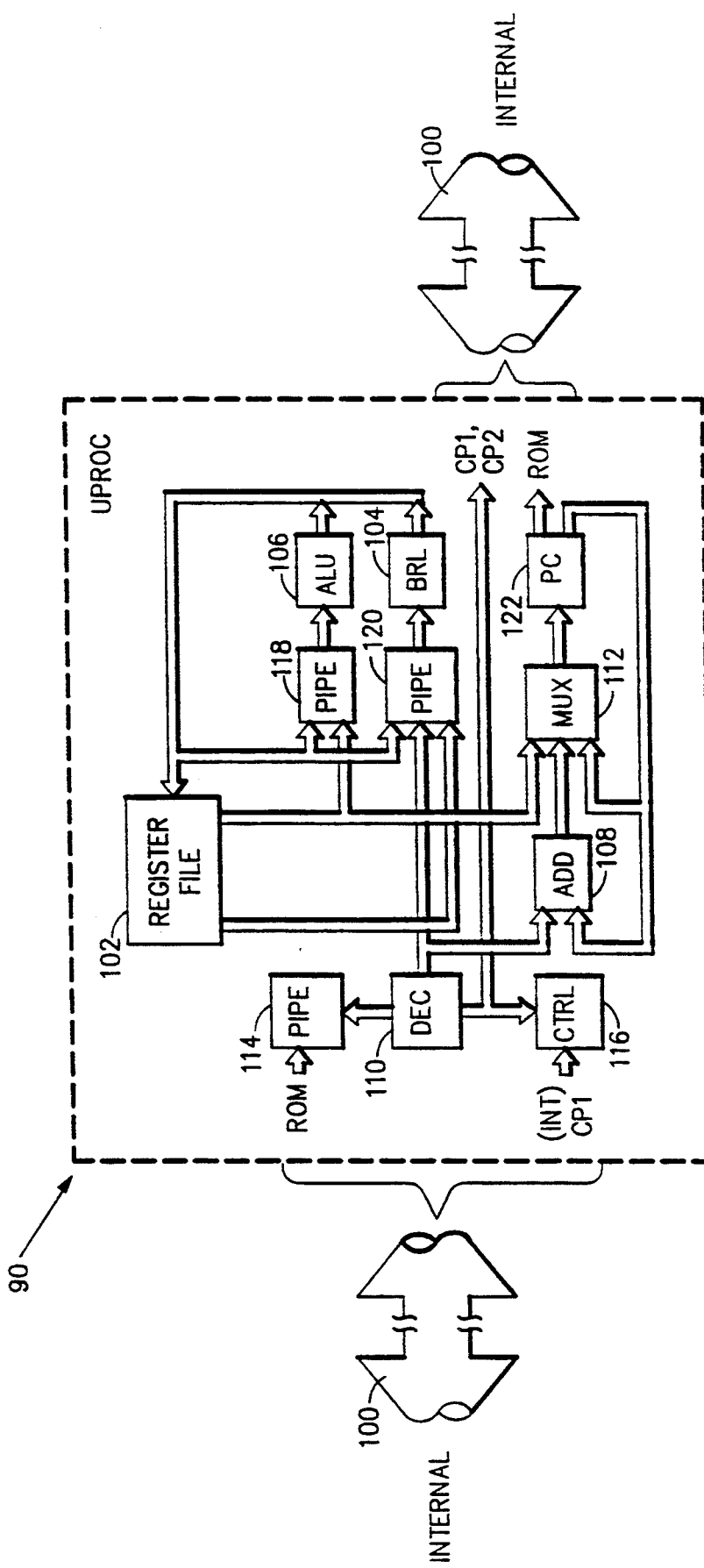
FIGS. 3–6 are block diagrams of separate portions of the IC of FIG. 1.

Referring to FIG. 3, the UPROC 90 comprises a standard architecture, including 30 general purpose registers and two auxiliary storage registers in a register file 102. Six interrupt inputs from CP1 with individually programmable interrupt vectors provide fast interrupt servicing. A synchronous bus interface to both coprocessors transfers data to and from the UPROC. The microcode instructions from ROM are provided to the UPROC. Other components within the UPROC include a barrel shifter 104, arithmetic logic unit 106, adder 108, decrementer 110, multiplexer 112, and several pipeline stages 114, 118, 120. Control circuitry 116 for the interrupts is included, along with a 16-bit program counter 122 used to access the microcode stored in ROM.

Figure 4:
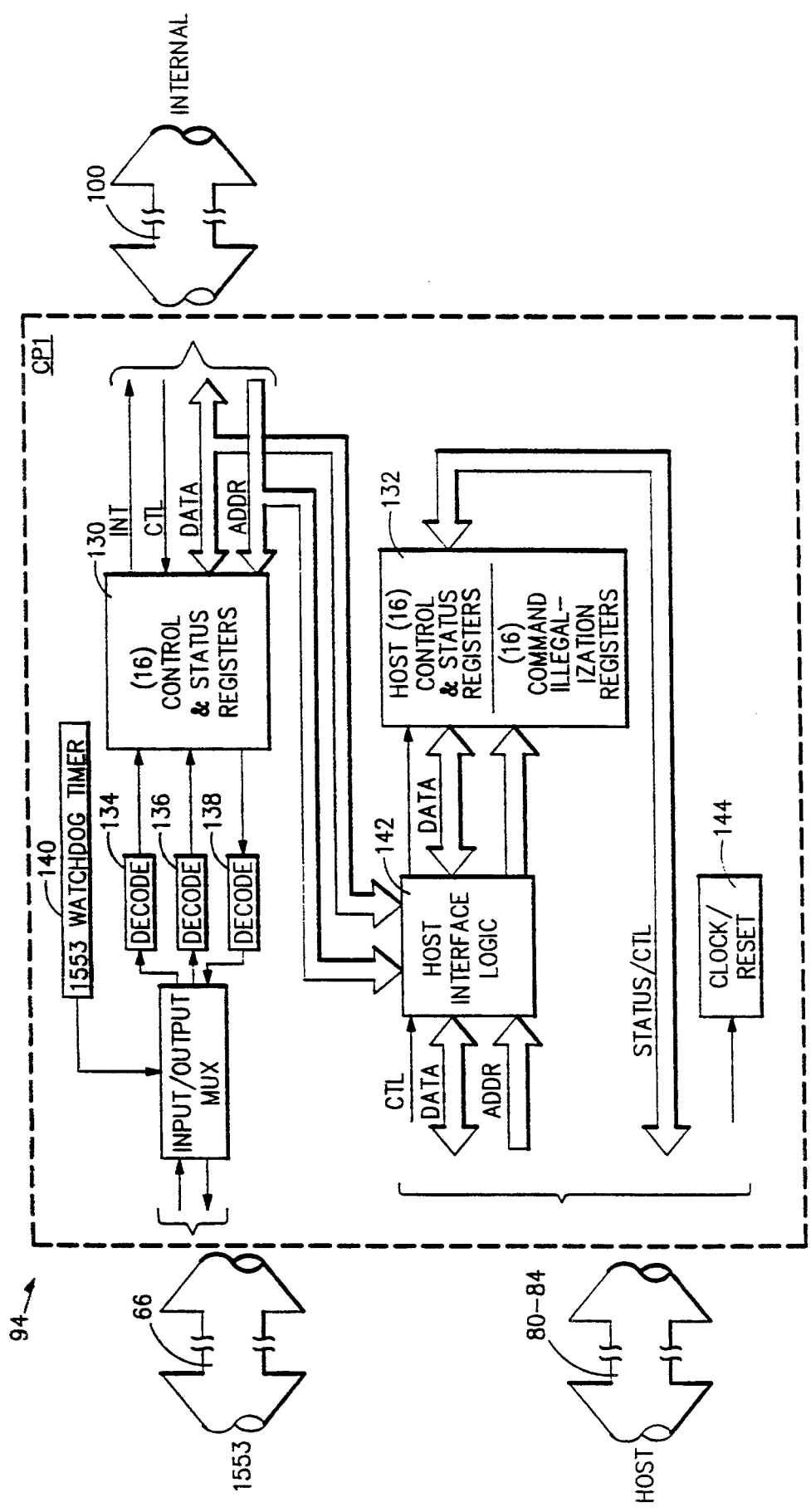

Referring to FIG. 4, CP1 94 includes addressable locations for 1553 bus control, data and interrupt generation, comprising 16 programmable control, status and interrupt registers 130. CP1 also includes 32 16-bit dual-port read/write registers 132 for host control. The host registers are divided into 16 control registers and 16 remote terminal illegalization registers. Detailed descriptions of all CP1 host registers is found in the UT69151 Product Handbook available from UTMC. An interrupt to the UPROC is generated whenever the host is attempting to change the configuration of the IC.

CP1 also includes dual-redundant Manchester II decoders 134, 136 that monitor the 1553 bus for command, status and data word patterns, and provide for complete Manchester II error detection. Each decoder 134, 136 checks for the proper sync pulse and Manchester waveform, edge skew, correct number of bits, and parity. Each decoder generates an interrupt to the UPROC when either Manchester sync and five bits, or a data word are received. An encoder 138 generates Manchester II true and complement data and provides interrupts to the UPROC indicating data ready or data overflow conditions.

CP1 includes a 760 microsecond fail-safe, watchdog timer 140 to prevent babbling conditions by limiting the time that the encoder transmits. The 1553 command processing is interrupt driven from the encoder and decoder. When an interrupt condition occurs, one of the six hardware interrupts to the UPROC is asserted. CP1 also includes host interface logic 142, which arbitrates access to CP1's internal registers. A clock and reset circuit 144 is also included.

To access CP1's host registers, the host uses the first half system clock cycle while the UPROC uses the second half clock cycle to perform register writes. Register reads may be performed concurrently. The host can determine the current operational configuration of the IC, mask interrupts, clear interrupts, modify the Tag/Frame timer clock, and illegalize 16 remote terminal subaddresses.

Figure 5:
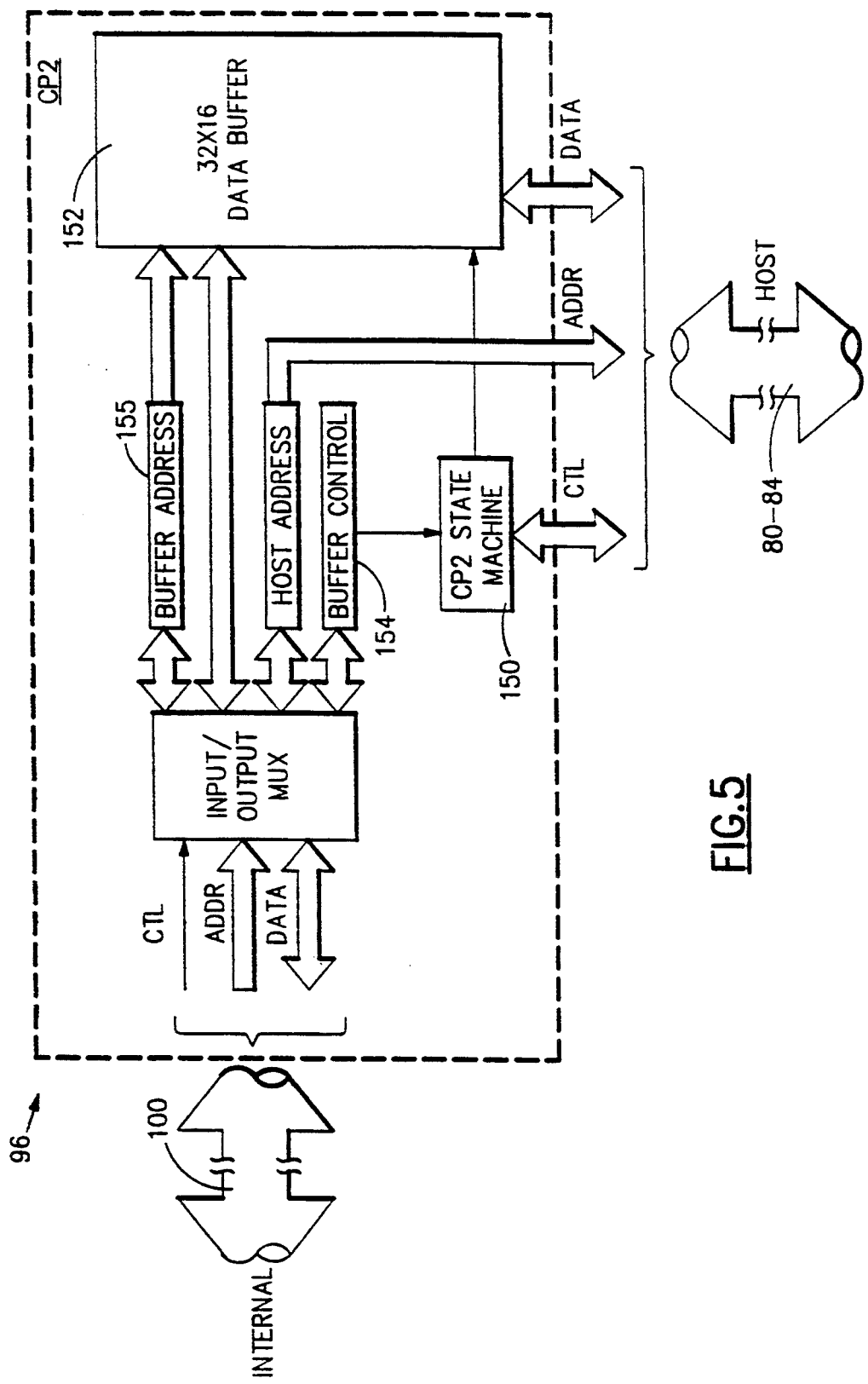

Referring to FIG. 5, CP2 96 interfaces between the IC and external memory 74 (FIG. 2). A standard DMA interface 150, including a DMA sequencer and DMA control registers, interrupt control logic, and a 32 word read/write data buffer 152 are incorporated in CP2. The data buffer 152 provides single stage data buffering for external memory read/writes in a stack. Sequential stack accesses automatically increment through the data until the stack is empty. A buffer start address must be loaded before accessing the stack.

Data transfers are controlled by a single control register 154 and referenced to a 16-bit memory index 155. Subsystem DMA operations use the value of this memory index as the host memory address, which automatically increments after every host memory read or write operation. The DMA control register 154 contains all interrupt and control bits as well as a word count for data transfers.

Figure 6:
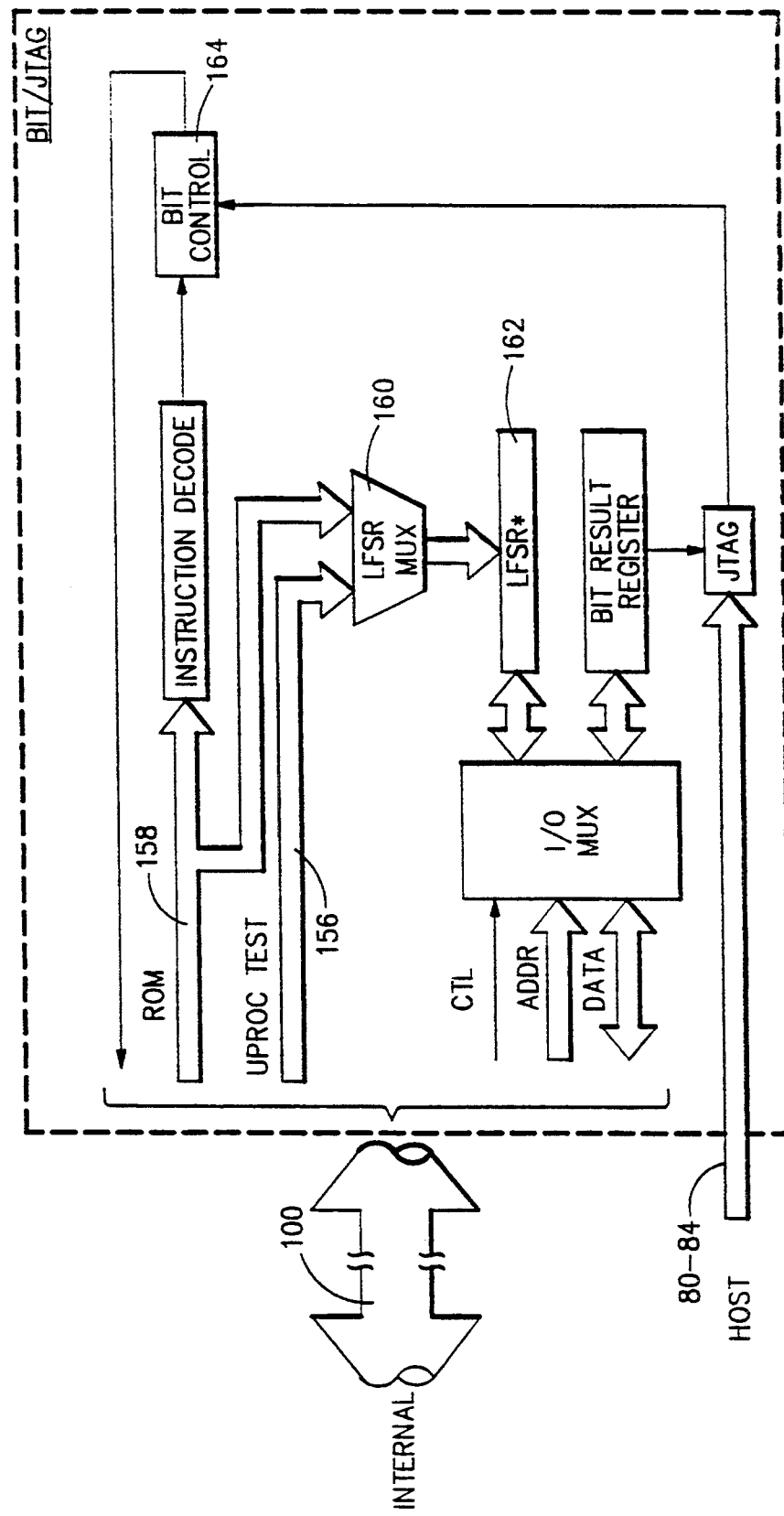

Referring to FIG. 6, there illustrated is the logic for the Built In Test ("BIT") and JTAG functions. A number of UPROC self-test points 156 are input along with instructions 158 to a linear feedback shift register ("LFSR") multiplexer 160, which selects one input to be fed to a LFSR 162, which generates a signature of test points within the IC. BIT control circuitry 164 sequences CP1, CP2, ROM and the UPROC through the entire BIT sequence.

The monitor terminal operation of the IC is based upon a monitor block structure similar to that of the bus controller, described hereinafter. This is because in many applications, the monitor terminal may be required to function as the subsystem's backup bus controller. To initialize the IC as a monitor terminal, the control register (register 0) of the 16 programmable internal host registers of CP1 must be initialized. The remaining 15 registers offer many programmable monitor terminal functions and allow the host access to a wide range of information.

When the IC is operating non-autonomously (i.e., under control of the host), the host must initialize the starting location of the monitor block, along with other registers among the 16 programmable internal registers of CP1. From then on, the IC will build a monitor block for each message it receives over the 1553 bus.

The monitor block architecture for message definition is located in the external memory. The monitor block requires eight contiguous memory locations for each message. These eight locations include, in order, a message information word, two command word locations, a data pointer, two status word locations, a time-tag location, and an unused location. The message information word provides information about the message that the monitor terminal extracted.

When utilized as a remote terminal, the UT69151 IC 50 processes messages using data supplied in CP1's 32 internal registers and in external memory. The remote terminal accesses a four word descriptor block stored in external memory. The descriptor block is accessed at the beginning and end of command processing. Multiple descriptor blocks are sequentially entered into memory to form a descriptor table.

The host controlling remote terminal operation allocates 512 consecutive memory spaces for the subaddress and mode code descriptor table. Each subaddress and mode code has a descriptor block reserved in memory. Each four word descriptor block contains a control word, data pointer A, data pointer B, and broadcast data pointer. The top of the descriptor table can reside at any address location. Defined and entered into memory by the host, the remote terminal is linked to the descriptor table via the descriptor address register, which is one of the 16 programmable host registers in CP1. The descriptor address register contains an address that points to the top of a particular descriptor block. The remote terminal uses the T/R bit, subaddress/mode field, and mode code in the command word received from the 1553 bus to select one descriptor block within the descriptor table for message processing.

Control word information allows the remote terminal to generate interrupts, buffer messages, and control message processing. For a receive command, the data pointer is read to determine the top of the data buffer. The remote terminal stores data sequentially from the top of the data buffer plus two locations. When processing a transmit command, the data pointer is read to determine where data words are retrieved. The remote terminal retrieves data words sequentially from the address the data pointer designates plus two address locations.

The broadcast data pointer allows for separate storage of non-broadcast data from broadcast data per 1553. The host enables or disables this feature via the control word in the descriptor block. When disabled, the non-broadcast and broadcast data is stored via either of the data pointers. For transmit commands, the broadcast data pointer is not used. The remote terminal does not transmit any information on the receipt of a broadcast transmit command.

The remote terminal reads the descriptor block during command processing and arbitrates for the memory bus. After receiving control of the bus, the remote terminal reads the control word and three data pointers. The remote terminal then surrenders control of the bus back to the bus master. The remote terminal then begins the acquisition of data words for either transmission or storage.

After transmission or reception, the remote terminal begins post-processing. Command post-processing begins with arbitration for the memory bus. The remote terminal performs a DMA burst during post-processing. An optional interrupt log entry is performed after a descriptor update. During the descriptor update, the remote terminal modifies the control word and updates the data pointers if no message errors occurred during the message transaction. Reception of a broadcast command, with no message errors, results in the update of the broadcast data pointer.

When utilized as a bus controller, the IC is an interface device linking the 1553 bus 66 to a host 52. As defined in 1553, the bus controller initiates all communications on the bus. Sixteen of the 32 internal CP1 host programmable registers direct bus controller operation.

Figure 7:
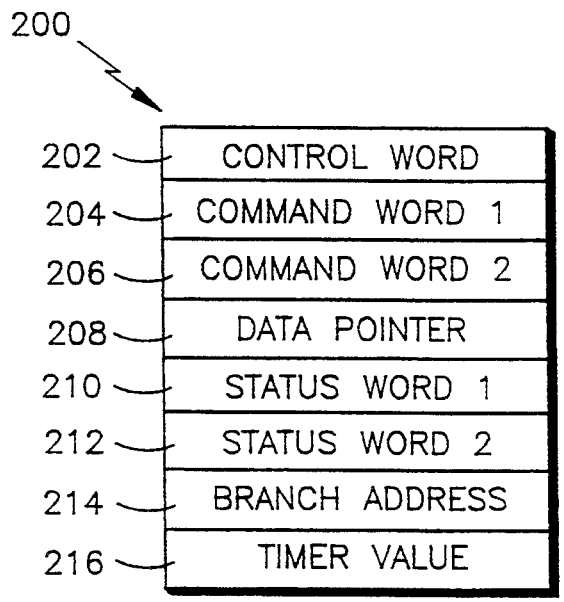
FIG. 7 is an illustration of a command block structure of data storage.

Referring to FIG. 7, bus controller operation is based on a command block 200 structure. Each command word transmitted over the 1553 bus by the bus controller must have a command block 200 associated therewith. The command blocks are stored in external memory 74 and are accessed therefrom when command execution is started. Each command block comprises an eight word structure having sixteen bits per word, consisting of one control word 202, two command words 204, 206, a data pointer 208, two status words 210, 212, a branch address 214, and a timer value 216; all stored in eight contiguous external memory locations.

The command blocks themselves are stored contiguously in memory. The host (or ROM for autonomous UT69151 IC operation) must initialize each location within a command block, except for the two status locations that are updated as command words are transmitted and corresponding status words are received.

The 16-bit control word 202 contains a four-bit field that defines opcodes. The remaining twelve bits in the control word provide for status and control. Information in the control word allows the bus controller to control the commands transmitted over the 1553 bus. The control word allows the bus controller to transmit commands on a specific channel, perform retries, initiate remote terminal to remote terminal transfers, and interrupt on certain conditions.

Opcodes are instructions to the bus controller that define its operation. The UT69151 IC provides for 16 different opcodes. Table 1 lists the opcodes available for the UT69151 IC operating in the bus controller ("BC") mode. Listed are the binary values of the four control word bits, along with the name of the opcode and its definition.

TABLE 1

0000 End of List: instructs the BC that the end of the command block has been encountered. Command processing stops and the interrupt is generated if enabled.

0001 Skip: instructs the BC to load a message timer with the value in the timer value location in the command block. The BC then waits the specified time before proceeding to the next command block. This opcode allows for scheduling of specific time between message execution. No command processing takes place.

0010 Go To: instructs the BC to go to the command block as specified in the branch address location of the command block. No command processing takes place.

0011 Built-in Test ("BIT"): instructs the BC to perform an internal BIT. If the BC passes the BIT, then processing of the next command will continue. If the BC fails the BIT, then processing stops and an interrupt is generated if enabled. No command processing takes place.

0100 Execute block, Continue: instructs the BC to execute the current command block and proceed to the next command block. This opcode allows for continuous operation.

0101 Execute block, Branch: instructs the BC to execute the current command block and unconditionally branch to the location specified in the branch address location of the command block.

0110 Execute block, Branch on Condition: instructs the BC to execute the current command block and branch only if the condition is met. If no conditions are met, the opcode appears as an execute and continue.

0111 Retry on Condition: instructs the BC to perform automatic retries, as specified in the control word, if particular conditions occur. If no conditions are met, the opcode appears as an execute and continue.

1000 Retry on condition, Branch: instructs the BC to perform automatic retries, as specified in the control word, if particular conditions occur. If the conditions are met, the BC retries. Once all retries have executed, the BC branches to the location as specified in the branch address location. If no conditions are met, the opcode appears as an execute and branch.

1001 Retry on condition, Branch if all Retries Fail: instructs the BC to perform automatic retries, as specified in the control word, if particular conditions occur. If the conditions are met and all retries fail, the BC branches to the location specified in the branch address location. If no conditions are met, the opcode appears as an execute and continue.

1010 Interrupt, Continue: instructs the BC to interrupt and continue processing on the next command block. No 1553 processing occurs.

1011 Call: instructs the BC to go to the command block as specified in the branch address location without processing this block. The next command block address is saved in an internal register so that the BC may remember one address and return to the next command block. No command processing takes place.

1100 Return to Call: instructs the BC to return to the command block address saved during the Call opcode. No command processing takes place.

1101 Reserved: the BC will generate an illegal opcode interrupt, if enabled, and automatically stop execution is a reserved opcode is used.

1110 Load Minor Frame Timer ("MFT"): instructs the BC to load the MFT with the value stored in the timer location of the current command block. The MFT will be loaded after the previous MFT has decremented to zero. After the MFT is loaded with the new value, the BC will proceed to the next command block. No command processing takes place.

1111 Return to Branch: instructs the BC to return to the command block address saved during a Branch opcode. No command processing takes place.

Regarding the two command words, most 1553 messages use only the first command word; thus, it is the only command word initialized. However, in a remote terminal to remote terminal transfer, the first command word is the receive command and the second command word is the transmit command. Thus, both command words must be initialized for such transfers.

The data pointer indicates the first location in external memory to either store or retrieve data words associated with the message for the command block. The bus controller can store or retrieve the exact specified number of data words, thus making efficient use of external memory space. Note that for remote terminal to remote terminal transfers, the bus controller uses the data pointer as the location in external memory to store the transmitted data in the transfer. One common application for the data pointer is when the bus controller needs to send the same data words to several remote terminals. Here, each command block associated with those messages contains the same data pointer value, and, therefore, transmit and retrieve the same data.

Regarding the two status words, as the remote terminal responds on the 1553 bus to the bus controller's command, the corresponding status word sent by the remote terminal is stored in status word 1. In a remote terminal to remote terminal transfer, the first status word is that of the transmitting remote terminal while the second status word is that of the receiving remote terminal. Thus, both status words are recorded for such transfers.

The branch address contains the starting location of a branch which simply allows the bus controller to branch to another location in memory when certain opcodes are used. The timer value location contains a 16-bit data word to be used with opcodes that implement timer functions. These timer opcodes allow for scheduling of specific time between message execution.

The host (or ROM for autonomous operation) determines the first command block by setting the initial start address in a command block pointer register that is one of the 16 host programmable registers in CP1. The command blocks will then execute in a contiguous manner as long as no "go to", "branch", "call", or "return" opcodes are used. With the use of the opcodes, almost any external memory configuration is possible. Several command blocks may be linked together to form a command frame. After execution of the first command block is complete, the command block pointer register is automatically updated to point to the address associated with the next command block. Following the command block locations in external memory may be the memory locations required to store the data words.

Figure 8:
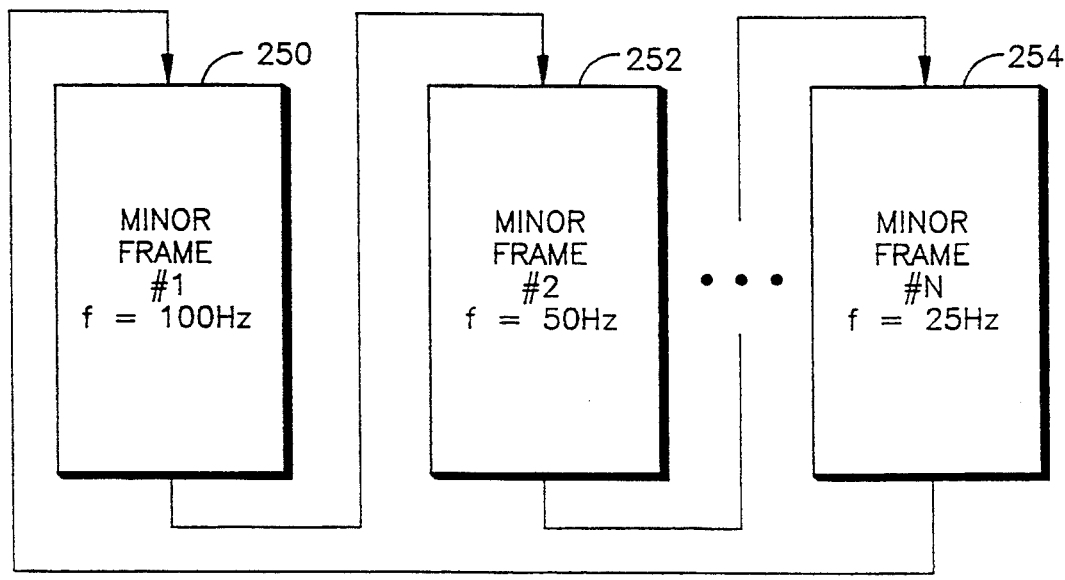
FIG. 8 is an illustration of an operational arrangement of the command blocks of FIG. 7, each command block executing at different frequencies in accordance with the present invention.

It may be desirable to sequentially execute several command frames at different frequencies. For example, FIG. 8 illustrates three different command frames 250, 252, 254, each referred to as a minor frame. A first minor frame 250 executes at 100 Hz. A second minor frame 252 executes at 50 Hz. A third minor frame 254 executes at 25 Hz. After the third minor frame has finished executing, processing returns to the first minor frame. The aggregate of the three minor frames is called a major frame. In this example the three minor frames are stored contiguously in external memory 74 (FIG. 2). It is to be noted, however, that three minor frames is purely exemplary. Any number N of minor frames may be executed sequentially in accordance with the teachings of the present invention. Also, the frequency of execution of each minor frame described is exemplary; other frequencies may be chosen without departing from the present invention.

In order to execute each minor frame at its desired frequency, the bus controller of the present invention implements a timer that controls the execution time of each frame. The timer provided is the timer value 216 in the last (i.e., eighth) word of the bus controller command block 200 (FIG. 7) described hereinbefore. The first command block of each minor frame must have its control word 202 contain the opcode having binary value 1110, entitled "bad Minor Frame Timer". When executing this opcode, the bus controller loads the Minor Frame Timer ("MFT") with the timer value appropriate for the desired execution frequency of the particular minor frame. The MFT is one of the 16 programmable registers 132 in CP1 94 (FIG. 4). The MFT is either driven by a clock input external to the IC, or by an internal 64 microsecond clock.

The MFT begins counting down and must decrement to zero before loading it with a value for the next minor frame. While the MFT is decrementing, the bus controller executes additional command blocks following the first command block. The MFT is loaded with a timer value that allows all command blocks within that minor frame to execute.

The present invention has been described for use with the MIL-STD-1553 data bus interface standard. However, it is to be understood that the invention is not limited to such standard and it may be used with any type of bus interface system in accordance with the teachings herein.

Although the invention has been illustrated and described with respect to a best mode embodiment thereof, it should be understood by those skilled in the art that the foregoing and various other changes, omissions, and additions in the form and detail thereof may be made without departing from the invention.

We claim:

1. An apparatus for interfacing with a serial multiplexed data bus, comprising:

memory means having a plurality of storage locations for storing data therein;

means for partitioning said plurality of storage locations in said memory means into storage areas, each of said storage areas containing at least two of said storage locations arranged contiguously, one of said storage locations within each of said storage areas containing an arrangement of individual bits indicative of an operational code, a plurality of said storage areas being arranged contiguously in a frame, a plurality of said frames being arranged contiguously;

signal processing means, operable in response to each of said operational codes of said storage areas of said memory means, for sequentially executing said plurality of said frames so as to control the transmission and reception of messages on the data bus in accordance with said operational codes stored within corresponding ones of said plurality of frames executed; and timer means for controlling said sequential execution of said signal processing means such that said signal processing means sequentially executes said plurality of said frames enabling at least two of said plurality of said frames to be executed at frequencies that differ from one another.

2. The apparatus of claim 1, wherein a first one of said storage areas within each one of said plurality of said frames contains a predetermined operational code and a predetermined timer value, said signal processing means being responsive to said predetermined operational code for loading said timer means with said predetermined timer value for a corresponding frequency of execution for each of said plurality of said frames.

3. The apparatus of claim 1, wherein said timer means comprises means for counting through said predetermined timer value and inhibiting said signal processing means from executing a next frame in said plurality of said frames until said timer means has counted through said predetermined value, each of said predetermined timer values being of a value where said signal processing means executes each of a plurality of blocks within each of said plurality of said frames.

4. The integrated circuit of claim 1, wherein said apparatus operates within one of several different system selectable MIL-STD-1553 operating modes said operating modes comprising a bus controller mode, a remote terminal mode, a monitor mode, and a concurrent monitor and remote terminal mode.

* * * * *